(12) United States Patent
York

(10) Patent No.: US 11,221,544 B1
(45) Date of Patent: Jan. 11, 2022

(54) PORTABLE CAMERA SUPPORT DEVICE FOR ELEVATED PHOTOGRAPHY AND/OR VIDEOGRAPHY

(71) Applicant: Brian York, Frisco, TX (US)

(72) Inventor: Brian York, Frisco, TX (US)

( * ) Notice: Subject to any disclaimer, the term of this patent is extended or adjusted under 35 U.S.C. 154(b) by 0 days.

(21) Appl. No.: 16/525,009

(22) Filed: Jul. 29, 2019

Related U.S. Application Data

(60) Provisional application No. 62/728,959, filed on Sep. 10, 2018.

(51) Int. Cl.
G03B 17/56 (2021.01)
F16M 11/24 (2006.01)
F16M 11/28 (2006.01)

(52) U.S. Cl.
CPC ......... *G03B 17/561* (2013.01); *F16M 11/242* (2013.01); *F16M 11/28* (2013.01)

(58) Field of Classification Search
USPC .......................................................... 396/428
See application file for complete search history.

(56) References Cited

U.S. PATENT DOCUMENTS

| | | | | | |
|---|---|---|---|---|---|
| 1,795,747 | A | * | 3/1931 | Viken | F16M 11/28 248/411 |
| 1,844,113 | A | * | 2/1932 | Beidler | F16M 11/34 403/300 |
| 5,065,249 | A | * | 11/1991 | Horn | F16M 11/10 348/375 |
| 5,072,910 | A | * | 12/1991 | May | F16M 11/28 248/170 |
| 5,305,356 | A | * | 4/1994 | Brooks | G21C 17/00 376/249 |
| 5,786,854 | A | * | 7/1998 | Slade | F16M 11/18 348/373 |
| 6,056,450 | A | * | 5/2000 | Walling | F16M 11/10 352/243 |
| D607,037 | S | * | 12/2009 | Lee | D16/244 |
| 9,366,376 | B2 | | 6/2016 | Kamm | |
| 9,568,143 | B2 | * | 2/2017 | Meir | F16M 11/16 |
| 10,146,106 | B1 | * | 12/2018 | Bergmann | G03B 17/561 |

(Continued)

OTHER PUBLICATIONS

Foxpro X-go Gecko 53.5" Folding Monopod / Tripod with FPH-42Q Ball Head & Case, https://www.amazon.com/Fotopro-Folding-Monopod-Tripod-FPH-42Q/dp/B0761XV3NF/ref=sr_1_1?dchild=1&keywords=fotopro+x-go+gecko&qid=1603305465&sr=8-1, Sep. 20, 2017. (Year: 2017).*

*Primary Examiner* — Rodney E Fuller
(74) *Attorney, Agent, or Firm* — The Law Office of Patrick F. O'Reilly III, LLC

(57) ABSTRACT

A portable camera support device for elevated photography and videography is disclosed herein. The portable camera support device includes a base assembly, the base assembly including a plurality of collapsible legs extending downwardly from a central hub; a telescoping mast assembly adjustably coupled to the central hub of the base assembly, the telescoping mast assembly including a plurality of telescoping pole members; and a camera mount coupled to an upper end of the telescoping mast assembly, the camera mount configured to attach a camera to the upper end of the telescoping mast assembly. The portable camera support device is configured to provide an elevated vantage point for the camera from which to photograph and/or record a desired area.

15 Claims, 14 Drawing Sheets

(56) References Cited

U.S. PATENT DOCUMENTS

| | | | |
|---|---|---|---|
| D888,814 S * | 6/2020 | Chen | D16/244 |
| D899,492 S * | 10/2020 | Hao | D16/244 |
| 2003/0161622 A1* | 8/2003 | Zantos | F16M 11/18 396/419 |
| 2007/0080268 A1* | 4/2007 | Worrell | F16M 11/28 248/177.1 |
| 2008/0224000 A1* | 9/2008 | Yang | G03B 17/561 248/188.5 |
| 2012/0181979 A1* | 7/2012 | Hudspeth | F16M 11/245 320/108 |
| 2013/0270405 A1* | 10/2013 | Hunter | F16M 11/046 248/125.8 |
| 2015/0076296 A1* | 3/2015 | Yang | F16M 11/26 248/163.2 |
| 2015/0195637 A1* | 7/2015 | Pawlan | F16M 11/28 248/161 |
| 2016/0077410 A1* | 3/2016 | Lytle | F16M 11/10 348/211.2 |
| 2018/0080601 A1* | 3/2018 | Bosnakovic | F16M 11/08 |
| 2019/0078728 A1* | 3/2019 | Wilson | F16M 11/32 |
| 2019/0128471 A1* | 5/2019 | Lin | F16M 11/245 |
| 2019/0249821 A1* | 8/2019 | Christensen | G03B 17/561 |

* cited by examiner

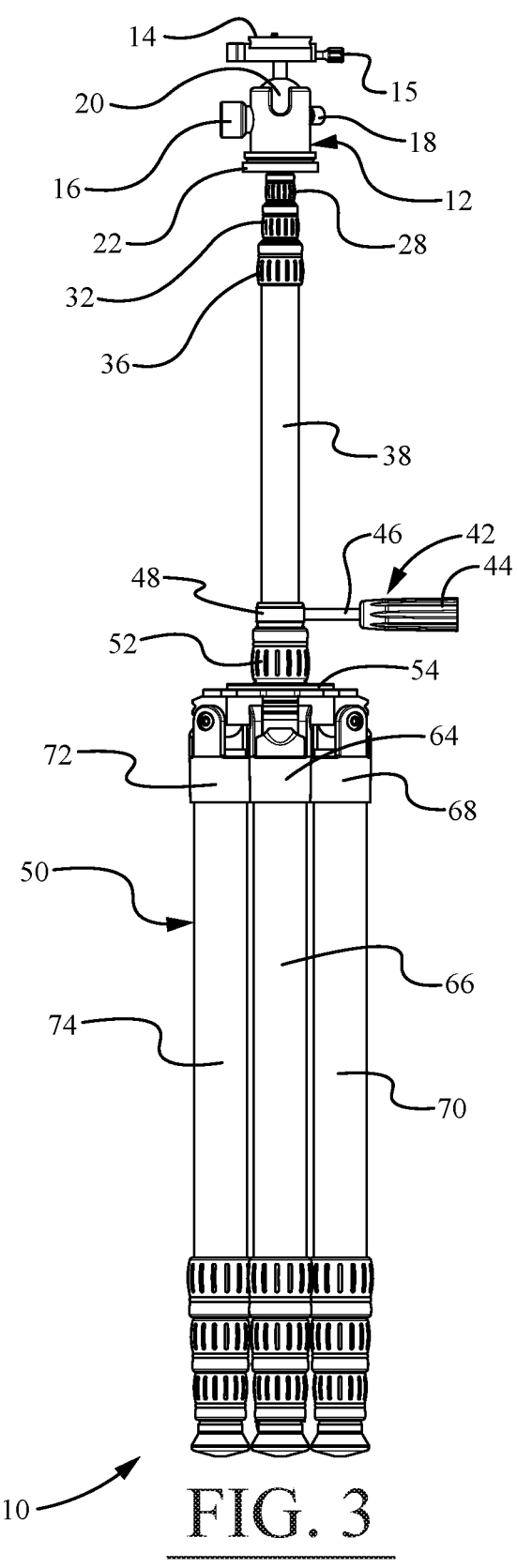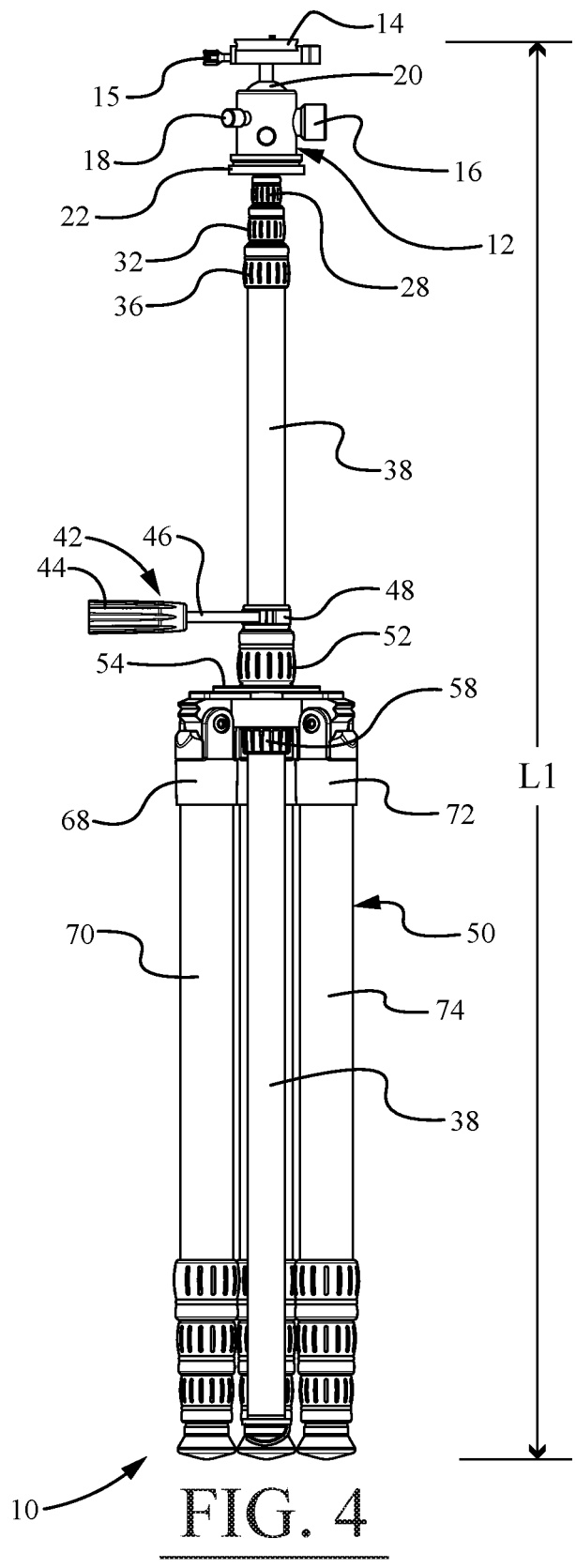

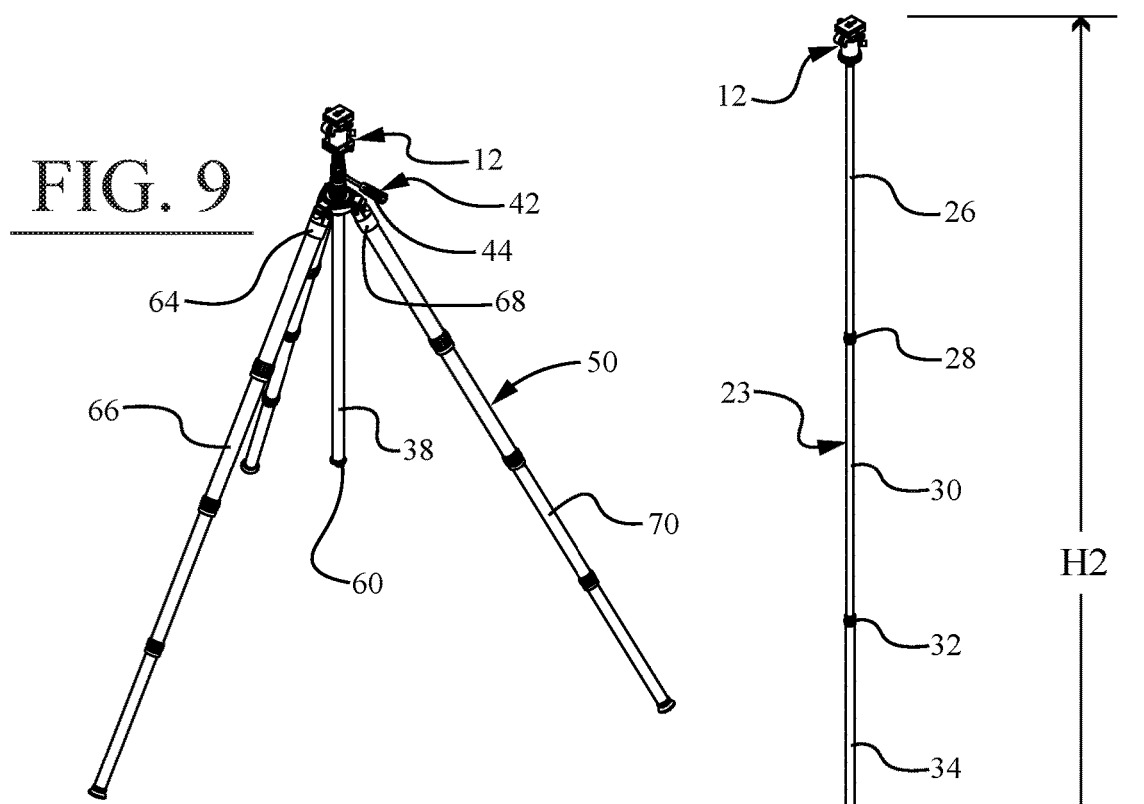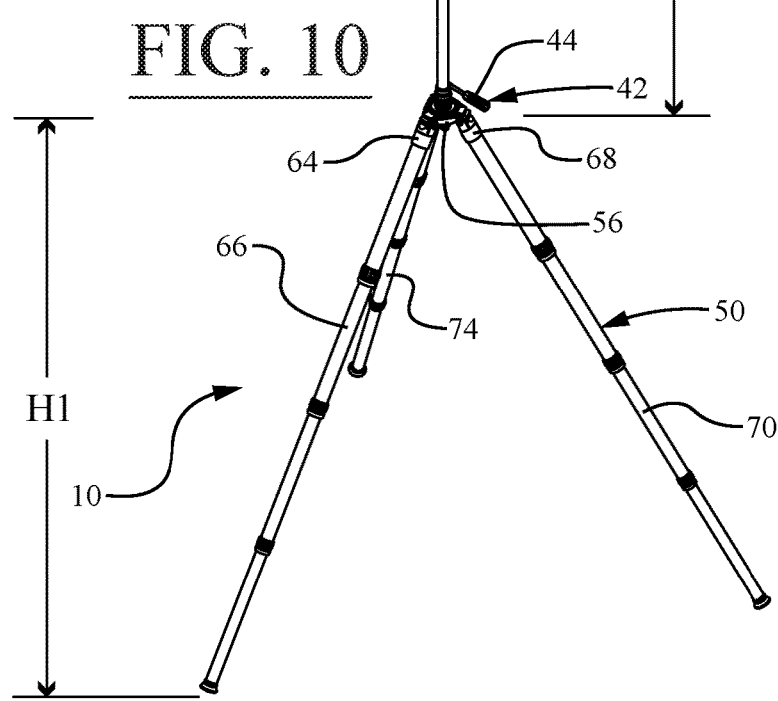

SECTION A-A

Detail "A"

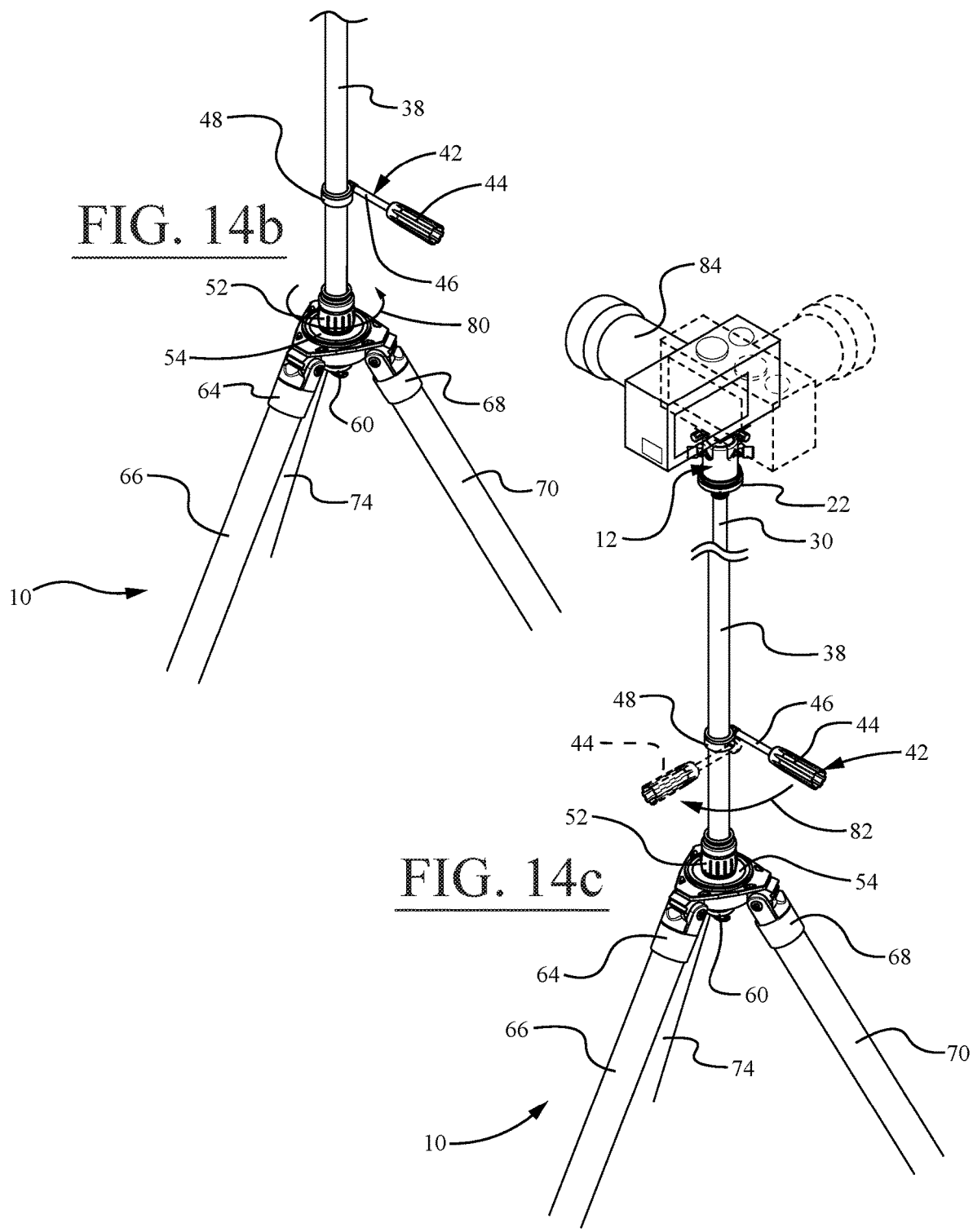

Detail "B"

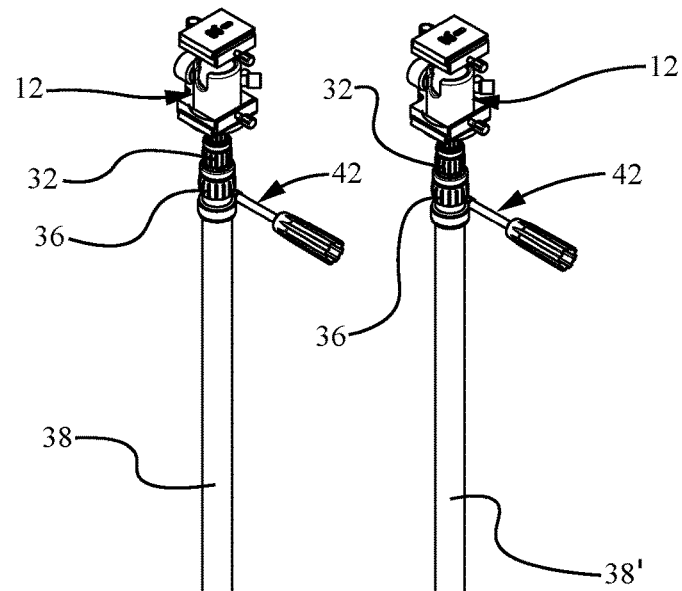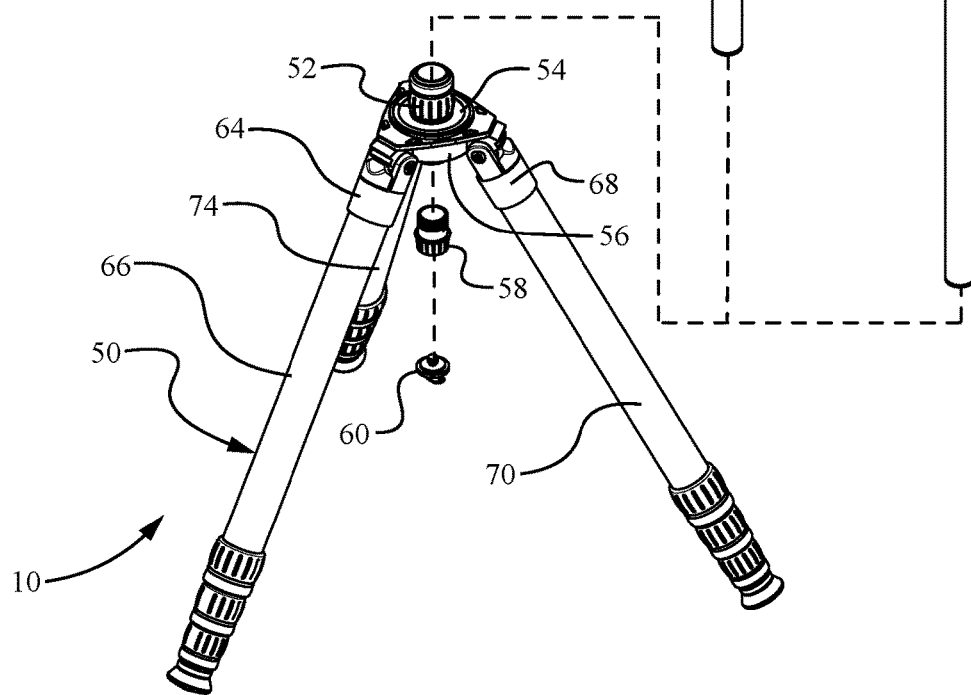
FIG. 17

PORTABLE CAMERA SUPPORT DEVICE FOR ELEVATED PHOTOGRAPHY AND/OR VIDEOGRAPHY

CROSS-REFERENCE TO RELATED APPLICATIONS

This patent application claims priority to, and incorporates by reference in its entirety, U.S. Provisional Patent Application No. 62/728,959, entitled "Portable Elevated Photo and Video System", filed on Sep. 10, 2018.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.
INCORPORATION BY REFERENCE OF MATERIAL SUBMITTED ON A COMPACT DISK
Not Applicable.

BACKGROUND OF THE INVENTION

1. Field of the Invention

The invention generally relates to a portable camera support device for elevated photography and/or videography. More particularly, the invention relates to a portable camera support device that is configured to provide an elevated vantage point for a camera from which to photograph and/or record a desired area.

2. Background

Professional photographers and videographers are commonly hired to photograph or record sporting events, practices, etc. Specific positioning must be taken to gain optimal view of the entire playing surface. The photographer or videographer must often move around to maintain proper views for recording the entire game. In some cases, the photographer may be unable to view the entire field or court leading to gaps in footage. Further, artificial platforms may be constructed to provide an elevated platform for the photographer or videographer to stand on, but these can be flimsy and dangerous, especially if used outdoors during windy weather. Accordingly, a device that is configured to enable a user to photograph or record an object from a vantage point is desired.

BRIEF SUMMARY OF EMBODIMENTS OF THE INVENTION

Accordingly, the present invention is directed to a portable camera support device that substantially obviates one or more problems resulting from the limitations and deficiencies of the related art.

In accordance with one or more embodiments of the present invention, there is provided a portable camera support device for elevated photography and videography. The portable camera support device includes a base assembly, the base assembly including a plurality of collapsible legs extending downwardly from a central hub; a telescoping mast assembly adjustably coupled to the central hub of the base assembly, the telescoping mast assembly including a plurality of telescoping pole members; and a camera mount coupled to an upper end of the telescoping mast assembly, the camera mount configured to attach a camera to the upper end of the telescoping mast assembly. The portable camera support device is configured to provide an elevated vantage point for the camera from which to photograph and/or record a desired area.

In a further embodiment of the present invention, the portable camera support device further comprises a handle coupled to the telescoping mast assembly, the handle being disposed proximate to the central hub, and the handle configured to allow a user to rotate the camera at the upper end of the telescoping mast assembly when the portable camera support device is in a deployed position.

In yet a further embodiment, when the portable camera support device is in a deployed position, the base assembly has a base height measured from the ground to the central hub, and the telescoping mast assembly has a mast height measured from the central hub to a top surface of the camera mount. In the deployed position, the mast height of the telescoping mast assembly is substantially greater than the base height of the base assembly.

In still a further embodiment, the plurality of collapsible legs of the base assembly are pivotably coupled to the central hub such that each of the plurality of collapsible legs is movable from a deployed position to a collapsed position for compact transportation and storage of the portable camera support device.

In yet a further embodiment, the plurality of collapsible legs of the base assembly comprises a first leg member, a second leg member, and a third leg member arranged in a tripod arrangement.

In still a further embodiment, at least one of the plurality of collapsible legs of the base assembly comprises a plurality of telescoping leg sections such that a length of the collapsible leg is adjustable between a collapsed position and an extended position.

In yet a further embodiment, the plurality of telescoping pole members of the telescoping mast assembly comprise a first telescoping pole member, a second telescoping pole member, and a third base pole member, the first telescoping pole member being slidingly received in the second telescoping pole member, and the second telescoping pole member being slidingly received in the third base pole member.

In still a further embodiment, the third base pole member is slidingly coupled to the central hub of the base assembly.

In yet a further embodiment, the plurality of telescoping pole members of the telescoping mast assembly comprise a first telescoping pole member, a second telescoping pole member, a third telescoping pole member, and a fourth base pole member, the first telescoping pole member being slidingly received in the second telescoping pole member, the second telescoping pole member being slidingly received in the third telescoping pole member, and the third telescoping pole member being slidingly received in the fourth base pole member.

In still a further embodiment, the portable camera support device further comprises a mounting bracket configured to support a visual display device operatively coupled to the camera, the mounting bracket being disposed proximate to the central hub.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 3 is a front elevational view of the portable camera support device of FIG. 1;

FIG. 4 is a rear elevational view of the portable camera support device of FIG. 1;

FIG. 9 is a perspective view of the portable camera support device of FIG. 1 in a partially deployed position;

FIG. 10 is a perspective view of the portable camera support device of FIG. 1 in a fully deployed position;

FIG. 14b is another partial perspective view of the portable camera support device of FIG. 1 in a deployed position, wherein the loosening of the upper clamp collar is illustrated so that the center mast is able to be slid relative to the central hub of the base assembly;

FIG. 14c is yet another partial perspective view of the portable camera support device of FIG. 1 in a deployed position, wherein the rotation of the center mast is illustrated after the upper clamp collar has been loosened;

FIG. 17 is another perspective view of the portable camera support device of FIG. 1 in a partially deployed position, wherein different sized center masts that can be used with the base assembly are shown.

Throughout the figures, the same parts are always denoted using the same reference characters so that, as a general rule, they will only be described once.

DETAILED DESCRIPTION OF EMBODIMENTS OF THE INVENTION

Figure 1:
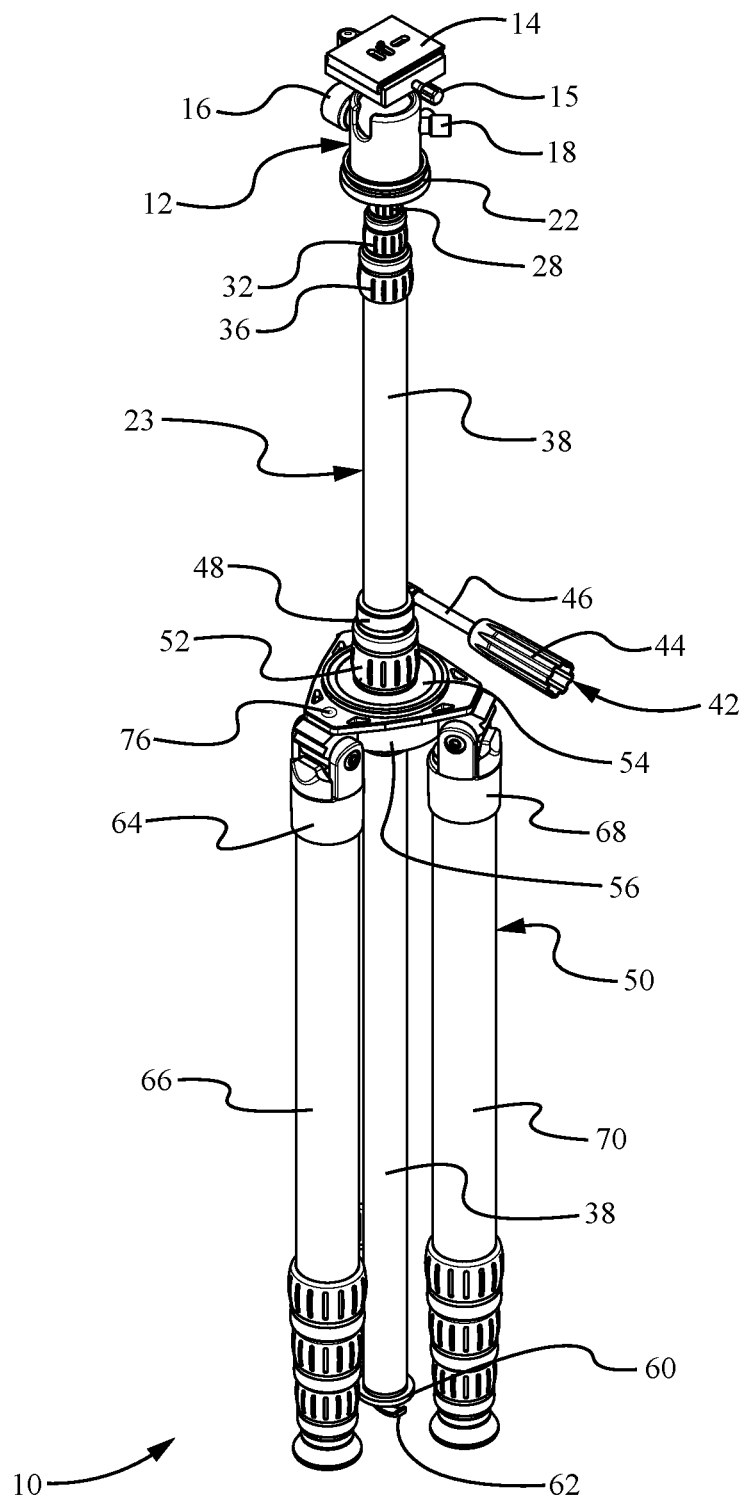
FIG. 1 is a perspective view of a portable camera support device in a collapsed position, according to an illustrative embodiment of the invention.

An illustrative embodiment of a portable camera support device for elevated photography and videography is seen generally at 10 in FIGS. 1-12. Initially, with combined reference to FIGS. 1 and 2, the illustrative portable camera support device 10 generally comprises a base assembly 50, the base assembly 50 including a plurality of collapsible legs 66, 70, 74 extending downwardly from a central hub 56; a telescoping mast assembly 23 adjustably coupled to the central hub 56 of the base assembly 50, the telescoping mast assembly 23 including a plurality of telescoping pole members 26, 30, 34, 38; and a camera mount 12 coupled to an upper end of the telescoping mast assembly 23, the camera mount 12 configured to attach a camera 84 to the upper end of the telescoping mast assembly 23 (see FIGS. 14c and 15). As shown in the perspective view of FIG. 15, the portable camera support device 10 is configured to provide an elevated vantage point for the camera 84 from which to photograph and/or record a desired area.

Figure 2:
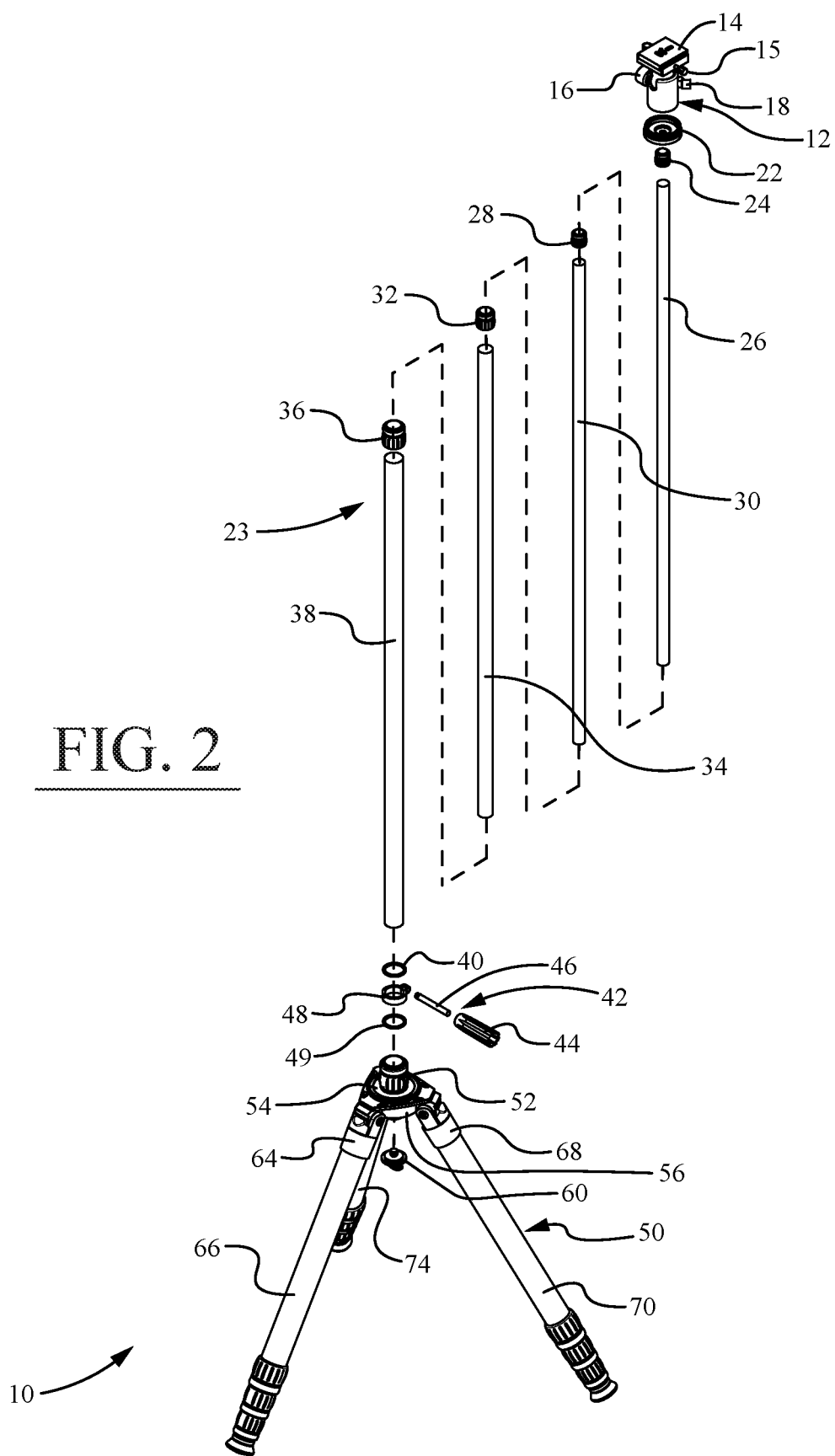
FIG. 2 is a partially exploded perspective view of the portable camera support device of FIG. 1.
Figure 5:
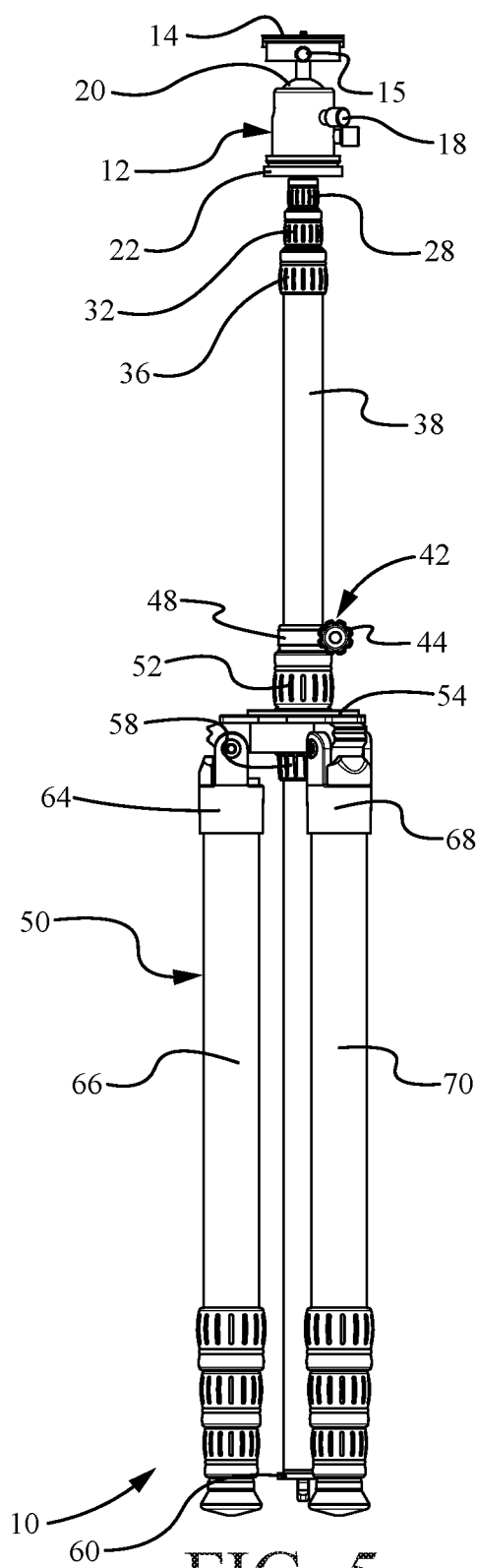
FIG. 5 is a first side elevational view of the portable camera support device of FIG. 1.
Figure 6:
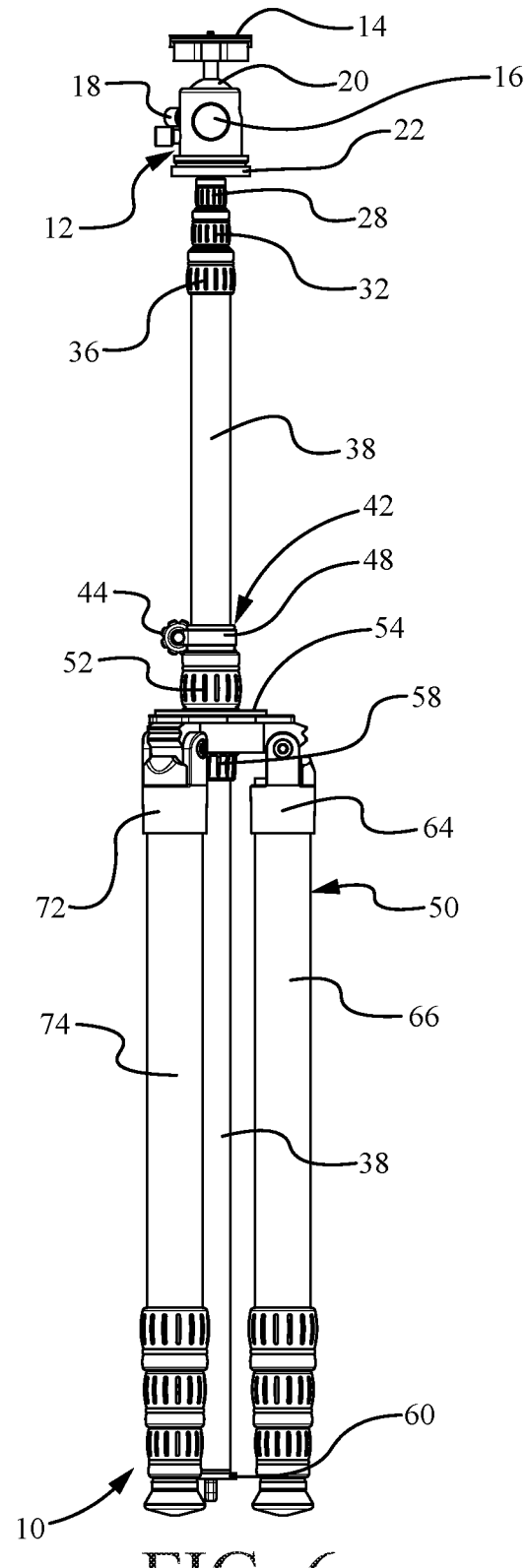
FIG. 6 is a second side elevational view of the portable camera support device of FIG. 1.

In the illustrative embodiment, the portable camera support device 10 may further comprise a handle assembly 42 coupled to the telescoping mast assembly 23 (see FIGS. 1, 2, and 14c). The handle assembly 42 is disposed proximate to the central hub 56, and includes a handle 44, a handle stem 46, and a handle collar 48. The handle stem 46 attaches the handle 44 to the handle collar 48, and the handle collar 48 attaches the handle stem 46 to the telescoping mast assembly 23 (refer to FIGS. 1-3). As diagrammatically illustrated by the curved arrow 82 in FIG. 14c, the handle 44 is configured to allow a user to rotate the camera 84 at the upper end of the telescoping mast assembly 23 when the portable camera support device 10 is in a deployed position. Advantageously, the portable camera support device 10 described herein moves the manipulation point of the camera much closer to the ground so that the user does not have to adjust the camera high in the air, and so that there is no need for pulleys, etc. for adjusting the camera. The adjustable handle 44 is used to manually manipulate the telescoping mast assembly 23 in a rotational capacity. The handle 44 allows the user to easily rotate the telescoping mast assembly 23 to capture the desired video footage or photograph(s). Once the handle assembly 42 is locked in place by the tightening of the handle collar 48 on the base pole member 38, the user is able to rotate the entire telescoping mast assembly 23 from ground level, thus eliminating the need for secondary elements to adjust and move the camera at its elevated position. As such, the portable camera support device 10 is simplified in terms of elements, and it reduces setup time, component cost, and opportunity for malfunction. By manipulating the entire telescoping mast assembly 23, the user is easily able to maintain the correct video angle with minimal movement of elements, thus reducing vibration and other interference and as a result, increasing the video quality.

Figure 14A:
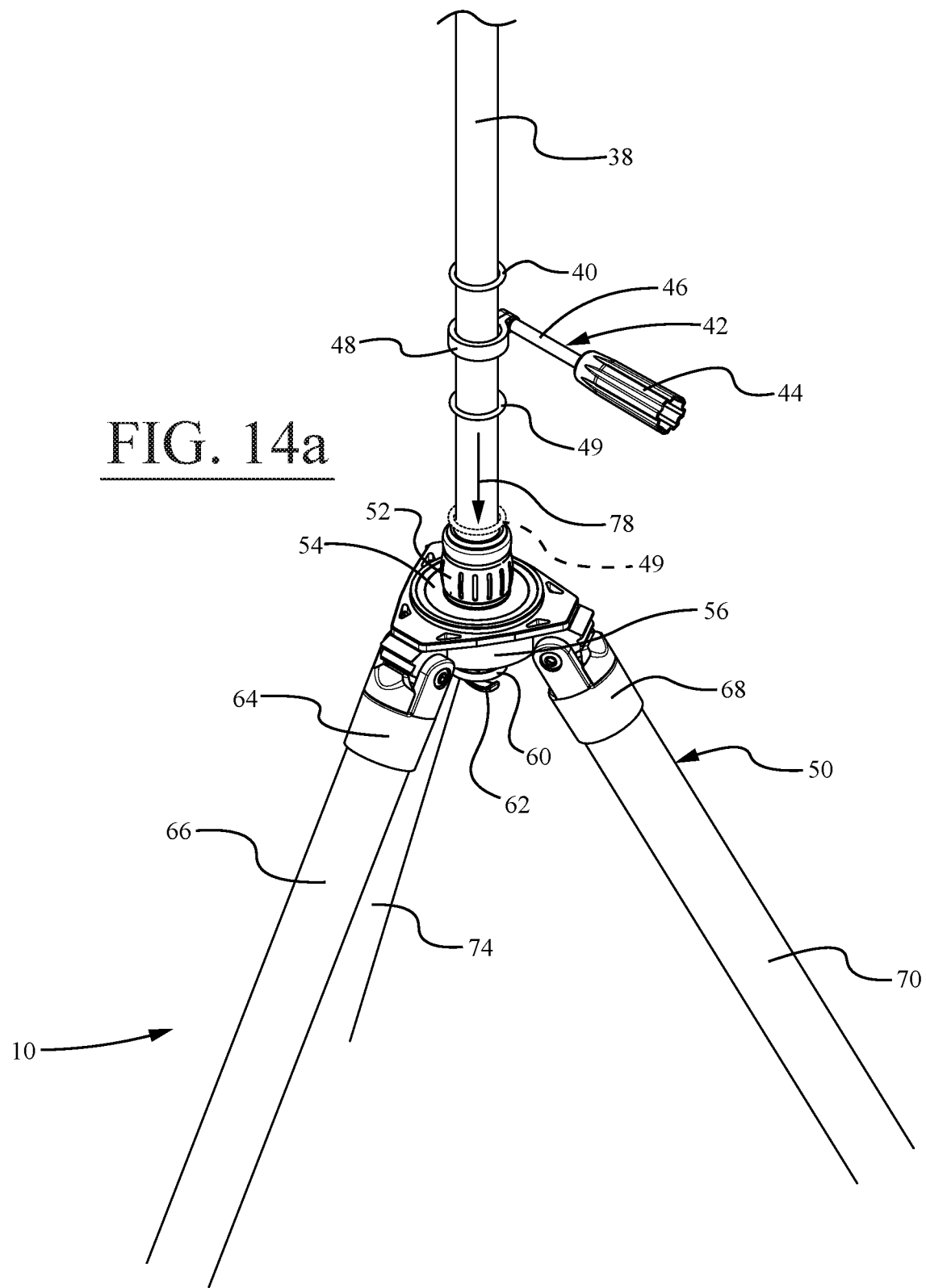
FIG. 14a is a partial perspective view of the portable camera support device of FIG. 1 in a deployed position, wherein the sliding of the lower O-ring is illustrated.

As shown in the illustrative embodiment of FIGS. 2 and 14a, the portable camera support device 10 may further comprise upper and lower O-rings 40, 49 disposed on the base pole member 38 of the telescoping mast assembly 23. As diagrammatically indicated by the arrow 78 in FIG. 14a, the lower O-ring 49 may be slidably adjusted up and down along the length of the base pole member 38. Advantageously, the lower O-ring 49 may act as a safety stop feature to prevent the handle assembly 42 from dropping suddenly (e.g., by positioning the lower O-ring 49 beneath the handle collar 48 to prevent the free sliding of the handle collar 48 downward along the length of the base pole member 38).

The lower O-ring 49 also advantageously prevents the marring of the top rim of the upper clamp collar 52 that will be described hereinafter. The upper O-ring 40 may be slidably adjusted up and down along the length of the base pole member 38 in a manner similar to the lower O-ring 49 to accommodate different user needs. The O-rings 40, 49 also may be used to buffer the handle assembly 42 from the locking friction collars 36, 52 both above and below in this section. The lower O-ring 49 additionally may serve as a safety mechanism for an accidental drop of the telescoping mast assembly 23 if the clamp collar 52 below is loosened incorrectly causing the telescoping mast assembly 23 to drop unexpectedly.

Now, referring again to FIGS. 1-6, 9, and 10, the base assembly 50 of the illustrative portable camera support device 10 will be described. As shown in the deployed position of the portable camera support device 10 depicted in FIG. 10, the plurality of collapsible legs of the base assembly comprises a first leg member 66, a second leg member 70, and a third leg member 74 arranged in a tripod arrangement. In the illustrative embodiment, the first leg member 66, the second leg member 70, and the third leg member 74 each comprise a plurality of telescoping leg sections (e.g., three telescoping leg sections and a base leg section—see FIG. 10) such that a length of each leg member 66, 70, 74 is adjustable between a collapsed position (i.e., FIG. 1 position) and an extended position (i.e., FIG. 10 position). Also, in the illustrative embodiment, each leg member 66, 70, 74 is provided with three (3) heavy-duty twist locks, one twist lock for each of the three (3) telescoping leg sections. Also, in the illustrative embodiment, each of the leg members 66, 70, 74 is pivotably coupled to the central hub 56 such that each of the plurality of collapsible legs 66, 70, 74 is movable from a deployed position (i.e., FIG. 10 position) to a collapsed position (i.e., FIG. 1 position) for compact transportation and storage of the portable camera support device 10. The central hub 56 serves as the unifying component for the telescoping mast assembly 23 and tripod base assembly 50. In the illustrative embodiment, the first leg member 66 is pivotably connected to the central hub 56 by a first pivotal connector 64, the second leg member 70 is pivotably connected to the central hub 56 by a second pivotal connector 68, and the third leg member 74 is pivotably connected to the central hub 56 by a third pivotal connector 72. The pivotal connectors 64, 68, 72 allow the collapsible legs 66, 70, 74 to be pivoted between the collapsed position of FIG. 1 and the deployed position of FIG. 10. Also, the pivotal connectors 64, 68, 72 include locking devices for maintaining the legs 66, 70, 74 in their deployed positions.

In the illustrative embodiment, when the portable camera support device 10 is in a deployed position (see FIG. 10), the base assembly 50 has a base height H1 measured from the ground to the central hub 56, and the telescoping mast assembly 23 has a mast height H2 measured from the central hub 56 to a top surface of the camera mount 12. In the deployed position, the mast height H2 of the telescoping mast assembly 23 is substantially greater than the base height H1 of the base assembly 50 (see FIG. 10). For example, in one or more exemplary embodiments, the mast height H2 may be approximately 3400 millimeters (11'-2"), whereas the base height H1 may be approximately 1470 millimeters (4'-10"). In the collapsed position, the overall length L1 of the portable camera support device 10 may be approximately 1143 millimeters (45 inches) or less so that the portable camera support device 10 can be easily transported and stored.

Figure 11:
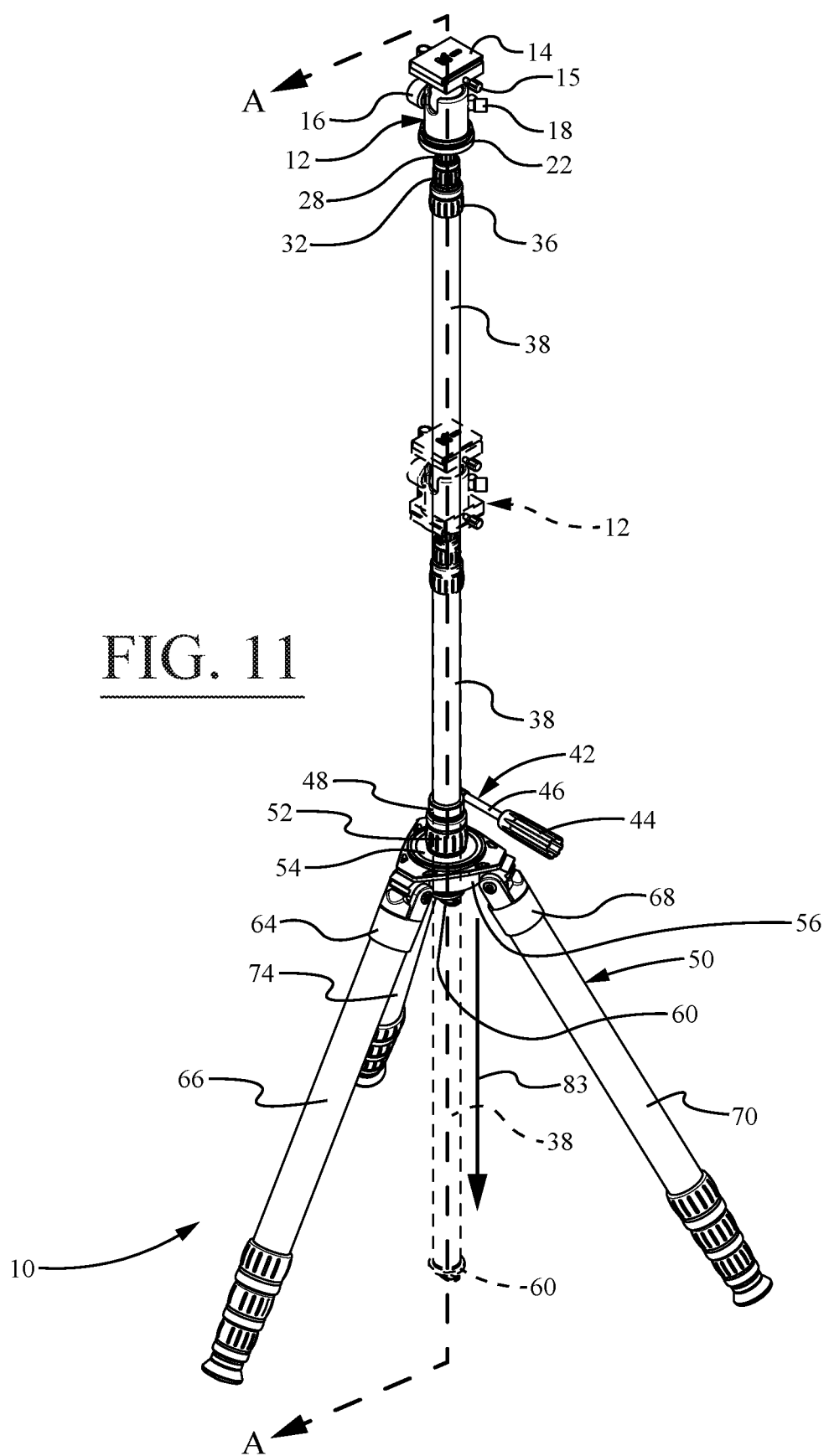
FIG. 11 is a perspective view of the portable camera support device of FIG. 1 in a partially deployed position, wherein the sliding of the center mast is illustrated.

Next, with particular reference to FIGS. 2, 10, and 17, the telescoping mast assembly 23 of the illustrative portable camera support device 10 will be explained. As shown in the illustrative embodiment of FIGS. 2 and 10, the plurality of telescoping pole members of the telescoping mast assembly 23 may comprise a first telescoping pole member 26, a second telescoping pole member 30, a third telescoping pole member 34, and a fourth base pole member 38. The first telescoping pole member 26 is slidingly received in the second telescoping pole member 30, the second telescoping pole member 30 is slidingly received in the third telescoping pole member 34, and the third telescoping pole member 34 is slidingly received in the fourth base pole member 38. Also, in the illustrative embodiment, as depicted in FIG. 11, the fourth base pole member 38 is slidingly coupled to the central hub 56 of the base assembly 50 (as diagrammatically represented by the arrow 83 in FIG. 11) so as to allow the height of the entire telescoping mast assembly 23 relative to the base assembly 50 to be adjusted. FIG. 11 illustrates two exemplary positions of the telescoping mast assembly 23 (i.e., the first position indicated in solid lines and the second position indicated in dashed lines). In the illustrative embodiment, by collapsing the tripod legs 66, 70, 74 and lowering the height of the center mast assembly 23 (e.g., to the dashed line position of FIG. 11), a minimal height of 45 inches shooting elevation may be achieved while also being able to fully extend the center mast assembly 23 to at least 15 feet in elevation, both of which may be achieved using the same device 10. Turning again to FIGS. 2 and 10, it can be seen that the telescoping mast assembly 23 further includes a plurality of twist knobs 28, 32, 36 for adjusting and fixing the positions of the telescoping pole members 26, 30, 34 relative to the respective pole members 30, 34, 38 in which they are received. To adjust the extending length of the first telescoping pole member 26 from the second telescoping pole member 30, a user rotates the twist knob 28 in a loosening rotational direction, slides the pole member 26 relative to the pole member 30, and then once the desired extending length of the pole member 26 is obtained, the user rotates the twist knob 28 in a tightening rotational direction to fix the pole member 26 in place relative to the pole member 30. Similarly, to adjust the extending length of the second telescoping pole member 30 from third telescoping pole member 34, a user rotates the twist knob 32 in a loosening rotational direction, slides the pole member 30 relative to the pole member 34, and then once the desired extending length of the pole member 30 is obtained, the user rotates the twist knob 32 in a tightening rotational direction to fix the pole member 30 in place relative to the pole member 34. Further, to adjust the extending length of the third telescoping pole member 34 from the fourth base pole member 38, a user rotates the twist knob 36 in a loosening rotational direction, slides the pole member 34 relative to the pole member 38, and then once the desired extending length of the pole member 34 is obtained, the user rotates the twist knob 36 in a tightening rotational direction to fix the pole member 34 in place relative to the pole member 38. In addition, in FIG. 2, it can be seen that the upper end of the first telescoping pole member 26 comprises a collar member 24 at the location where the first telescoping pole member 26 is connected to the camera mount 12.

In one or more exemplary embodiments, the first telescoping pole member 26 may have a diameter of approximately 22 millimeters, the second telescoping pole member 30 may have a diameter of approximately 25 millimeters, the third telescoping pole member 34 may have a diameter of approximately 28 millimeters, and the fourth base pole member 38 may have a diameter of approximately 31 millimeters. However, in other embodiments, different diameters may be used for the pole members 26, 30, 34, 38. Also, in other embodiments, the pole members 26, 30, 34, 38 may have different cross-sectional shapes (e.g., a square cross-sectional shape rather than a circular cross-sectional shape).

In the illustrative embodiment of FIG. 17, the interchangeable nature of telescoping mast assemblies of different lengths is illustrated. More particularly, as shown in FIG. 17, the central hub 56 of the portable camera support device 10 is able to accommodate the base pole member 38 described above having a first length, or alternatively, the base pole member 38' having a longer, second length for applications requiring a higher camera height. That is, the portable camera support device 10 allows the telescoping mast assembly 23 to be readily swapped out to accommodate different needs of a user. Advantageously, due to the configuration of the device 10, the center mast assembly is interchangeable with other configurations of a center mast assembly offering a range of options for height, weight bearing, and function.

As discussed above, in the illustrative embodiment, the telescoping mast assembly 23 of the portable camera support device 10 is slidably coupled to the base assembly 50 by means of the central hub 56. The central hub 56 and the components 52, 54, 58, 60, 62 functionally associated with the central hub 56 will be described with particular reference to FIGS. 2 and 13. In the enlarged sectional view of FIG. 13, it can be seen that an upper clamp collar 52 is provided above the central hub 56 for fixing the telescoping mast assembly 23 in place relative to the base assembly 50. More particularly, as diagrammatically indicated by the curved arrow 80 in FIG. 14*b*, when the upper clamp collar 52 is rotated in a loosening rotational direction by the user, the pole member 38 of the telescoping mast assembly 23 is able to be slid and/or rotated relative to the base assembly 50. FIG. 14*c* illustrates the rotation of the telescoping mast assembly 23 using the handle 44 after the upper clamp collar 52 has been loosened. Then, once the desired longitudinal and/or rotational position of the telescoping mast assembly 23 is obtained, the user rotates the upper clamp collar 52 in an opposite, tightening rotational direction to fix the pole member 38 relative to the base assembly 50. In the illustrative embodiment, the upper clamp collar 52 is used to set the lateral friction which controls the rotational resistance of the telescoping mast assembly 23. Additionally, the upper clamp collar 52 is used to adjust and hold the elevation of the base pole member 38 of the telescoping mast assembly 23. As illustrated in FIGS. 14*b* and 14*c*, when the lower O-ring 49 rests on the top of the upper clamp collar 52, the telescoping mast assembly 23 is generally prevented from sliding downward so that the rotational position of the telescoping mast assembly 23 can be adjusted without the undesirable downward sliding of the pole member 38 of the telescoping mast assembly 23.

Figure 13:
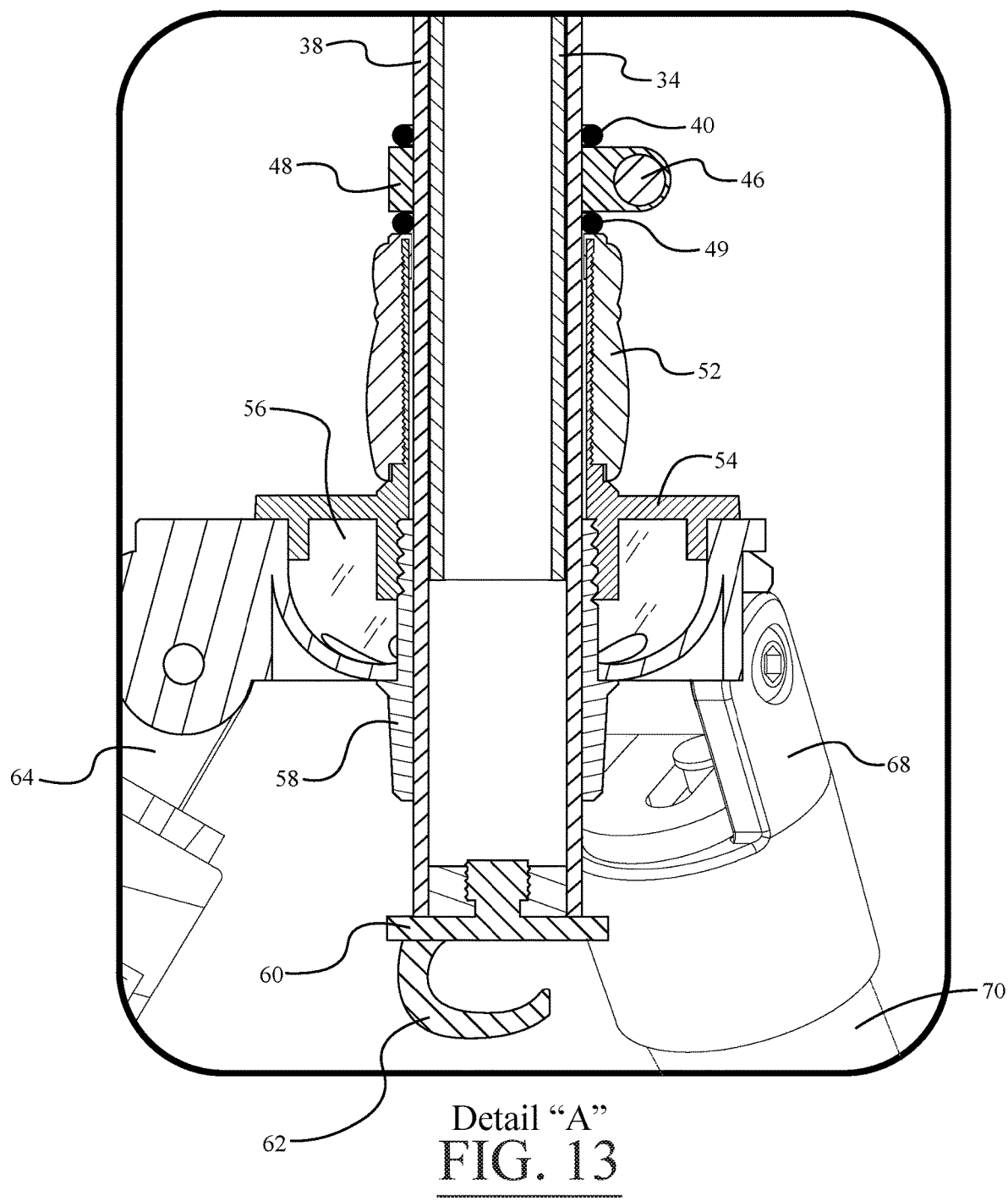
FIG. 13 is an enlarged sectional view of the portable camera support device of FIG. 12, wherein the connection of the center mast to the central hub of base assembly is illustrated (Detail "A")

Referring again to the illustrative embodiment of FIGS. 2 and 13, it can be seen that a top annular plate 54 is mounted to the top of the central hub 56. A lower threaded collar 58 threadingly engages with an internally threaded rim of the top annular plate 54 (see FIG. 13) so as to sandwich the central hub 56 therebetween. That is, the lower threaded collar 58 threadingly mates with the annular plate 54 above and combined these two components 54, 58 ensure the telescoping mast assembly 23 is securely mounted to the tripod base assembly 50. Also, as shown in FIG. 13, the top annular plate 54 also mates with the upper clamp collar 52 to securely mount the telescoping mast assembly 23 with the tripod base assembly 50. In the illustrative embodiment, the lower end of the pole member 38 of the telescoping mast assembly 23 comprises a cap member 60 mounted thereto (i.e., by a threaded pin that threadingly engages with the end of the base pole member 38—see FIG. 13). The cap member 60 has a counterweight hook 62 for supporting a hanging counterweight to stabilize the telescoping mast assembly 23 of the portable camera support device 10 by preventing lateral movement, particularly on uneven terrain, as will be described hereinafter.

Figure 7:
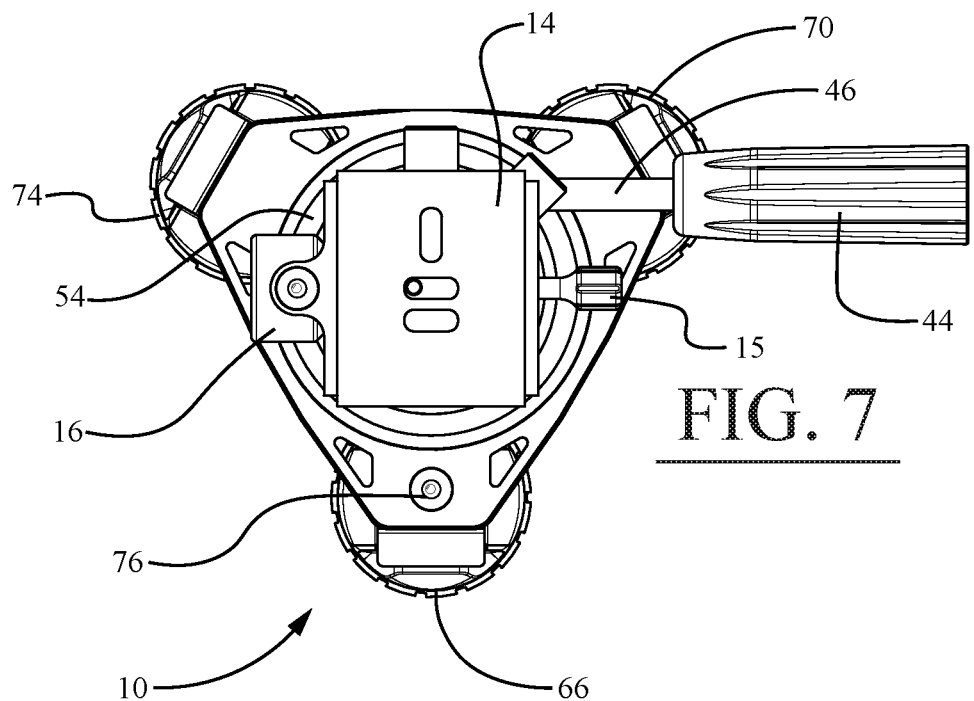
FIG. 7 is a top plan view of the portable camera support device of FIG. 1.
Figure 8:
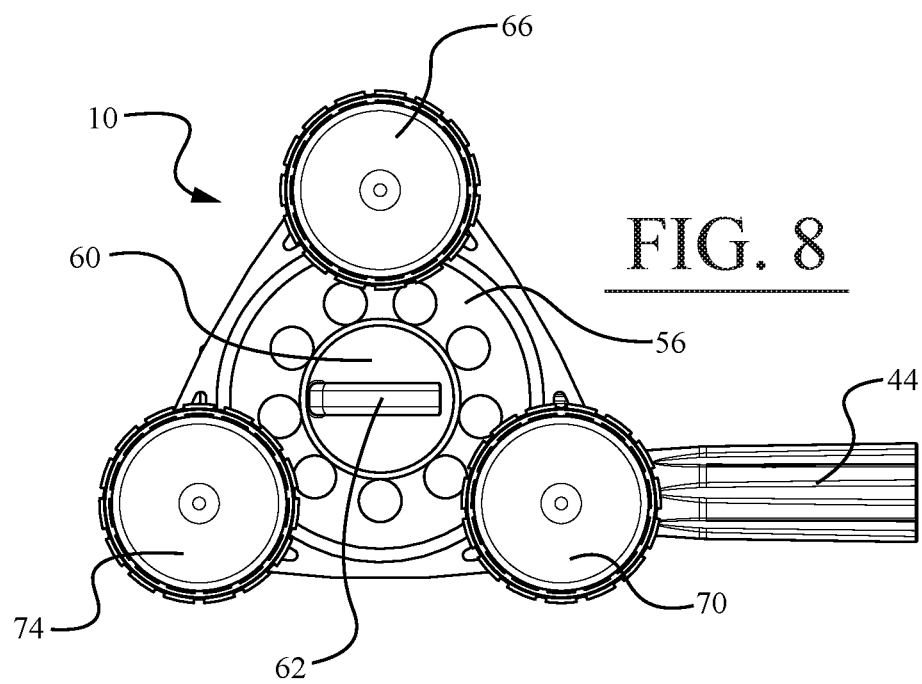
FIG. 8 is a bottom plan view of the portable camera support device of FIG. 1.

In the illustrative embodiment, as best shown in the top plan view of FIG. 7, a level indicator device 76 (e.g., with a floating level indicator bubble therein) is provided on the top of the central hub 56 so that a user may more easily position the portable camera support device 10 in a level manner on uneven terrain. The user is able to level the portable camera support device 10 on uneven ground by adjusting the base legs 66, 70, 74 of the base assembly 50 to different lengths until the level bubble of the level indicator device 76 is disposed in the center of the level indicator device 76. In the illustrative embodiment, the level indicator device 76 performs the function of ensuring that the base assembly 50 is level so as to ensure the zero angle of the extended center mast assembly 23. This level indicator feature is particularly beneficial given the variability of ground conditions the device 10 is designed to address.

In one or more other embodiments, a level indicator device may also be provided on the top receiver plate 14 of the camera mount 12.

Figure 12:
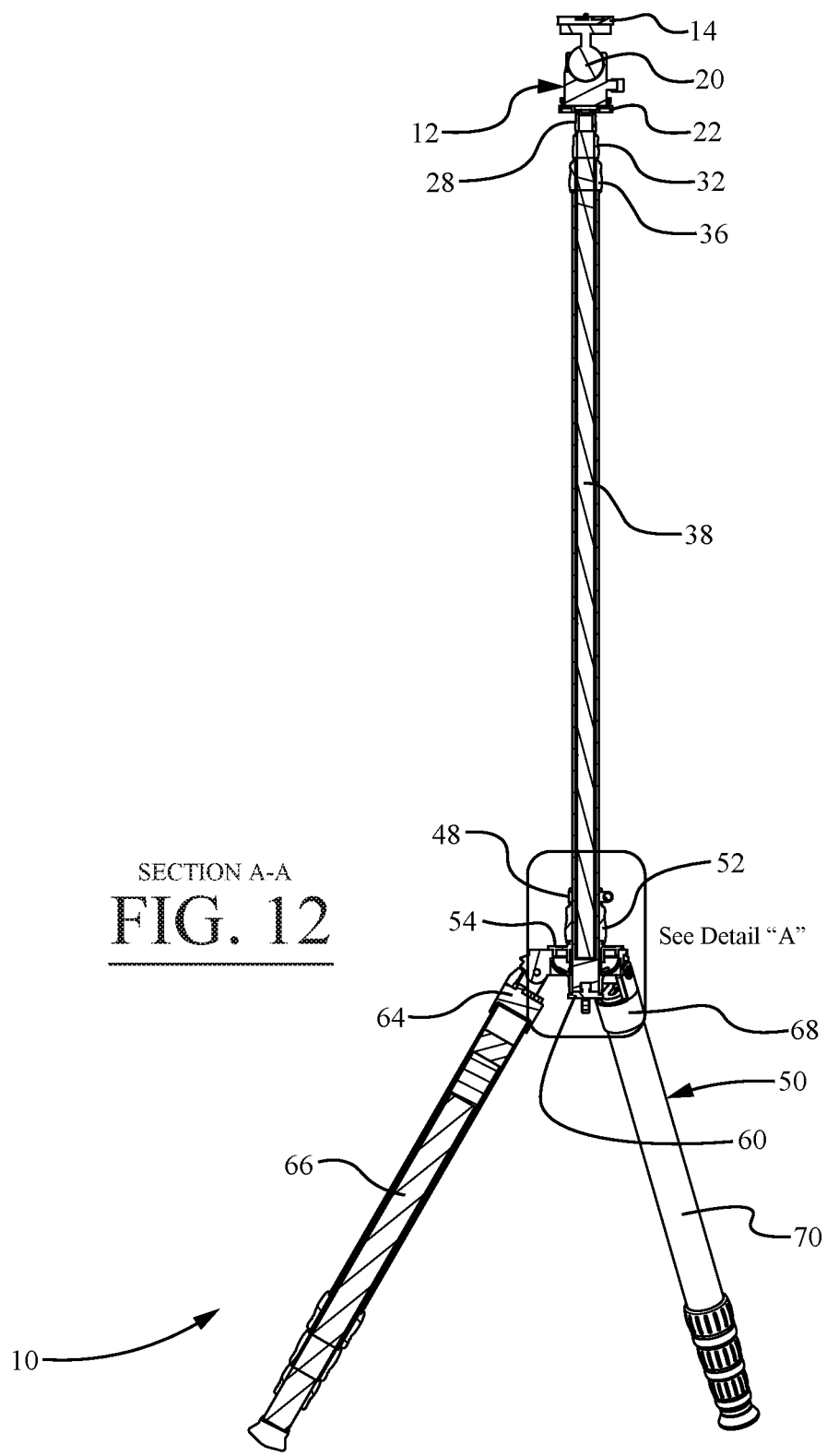
FIG. 12 is a longitudinal sectional view cut through the center mast and one of the base legs of the portable camera support device of FIG. 1, wherein the section is generally cut along the cutting-plane line A-A in FIG. 11.

With reference primarily to FIGS. 1, 2, and 12, the camera mount 12 of the illustrative portable camera support device 10 will now be described. As shown in the exploded view of FIG. 2, the illustrative camera mount 12 is in the form of a universal mount that includes a top receiver plate 14 for supporting the camera 84, an upper knob 15 for opening and closing the camera securement clamp on the top receiver plate 14, a lower adjustment knob 16, a lower securement knob 18, a rotatable ball head 20, and a disk plate 22. The upper knob 15 locks the camera into place on the top receiver plate 14 of the camera mount 12. The lower adjustment knob 16 is the main adjustment knob for securing the ball head 20 into place after setting the camera angle, and relative position to the center mast assembly 23. For fine adjustment and centering of the camera centerline with the tripod base and attached handle(s), the ball head assembly may be rotated relative to the center mast assembly 23. In one or more embodiments, the lower adjustment knob 16 may comprise an outer peripheral portion for making the preferred adjustments, and an inner locking portion for locking the ball head 20 into place. The lower securement knob 18 is configured to secure the ball head 20 in place as a secondary measure to the main ball head adjustment knob 16.

In the illustrative embodiment, the top receiver plate 14 of the camera mount 12 is designed to accommodate a camera weight of 10 lbs. or greater. The rotatable ball head 20 of the camera mount 12 allows for the full angular adjustment of the camera attached to the camera mount 12 so that the camera can be adjusted to nearly any tilt and/or or rotation angle desired by the user.

In one or more other embodiments, the portable camera support device 10 is designed such that a range of ball heads or other customized camera mounts can be accommodated.

In FIGS. 9 and 10, two setup stages of the illustrative portable camera support device 10 are depicted. First of all, in the first setup stage illustrated in FIG. 9, the base assembly 50 of the portable camera support device 10 is deployed by rotating the base legs 66, 70, 74 outwardly, and then extending the base legs 66, 70, 74 to their desired lengths. The level indicator device 76 described above is used to orient the base assembly 50 of the portable camera support device 10 in a level manner on the underlying ground. After leveling the base assembly 50 of the portable camera support device 10, the camera is attached to the top receiver plate 14 of camera mount 12, and then the orientation of the camera is adjusted using the knobs 16, 18 of the camera mount 12 while the camera is still easily accessible to the user (i.e., the viewing angle of the camera is set by the user before the camera is raised into the air). That is, in the FIG. 9 position, the user is afforded the ability to mount the camera, adjust the shooting angle, as well as ensure the tripod base is level and stable before extending the center mast assembly 23 to the desired height. Finally, in the second setup stage illustrated in FIG. 10, the telescoping pole members 26, 30, 34 of the telescoping mast assembly 23 are extended such that the camera is raised into its elevated position. FIG. 10 illustrates the fully extended configuration of the illustrative portable camera support device 10 with a camera mounting height of 15 feet or higher. The compact size of the folded device 10 relative to the fully extended height is an extremely useful feature of the illustrative portable camera support device 10.

Figure 15:
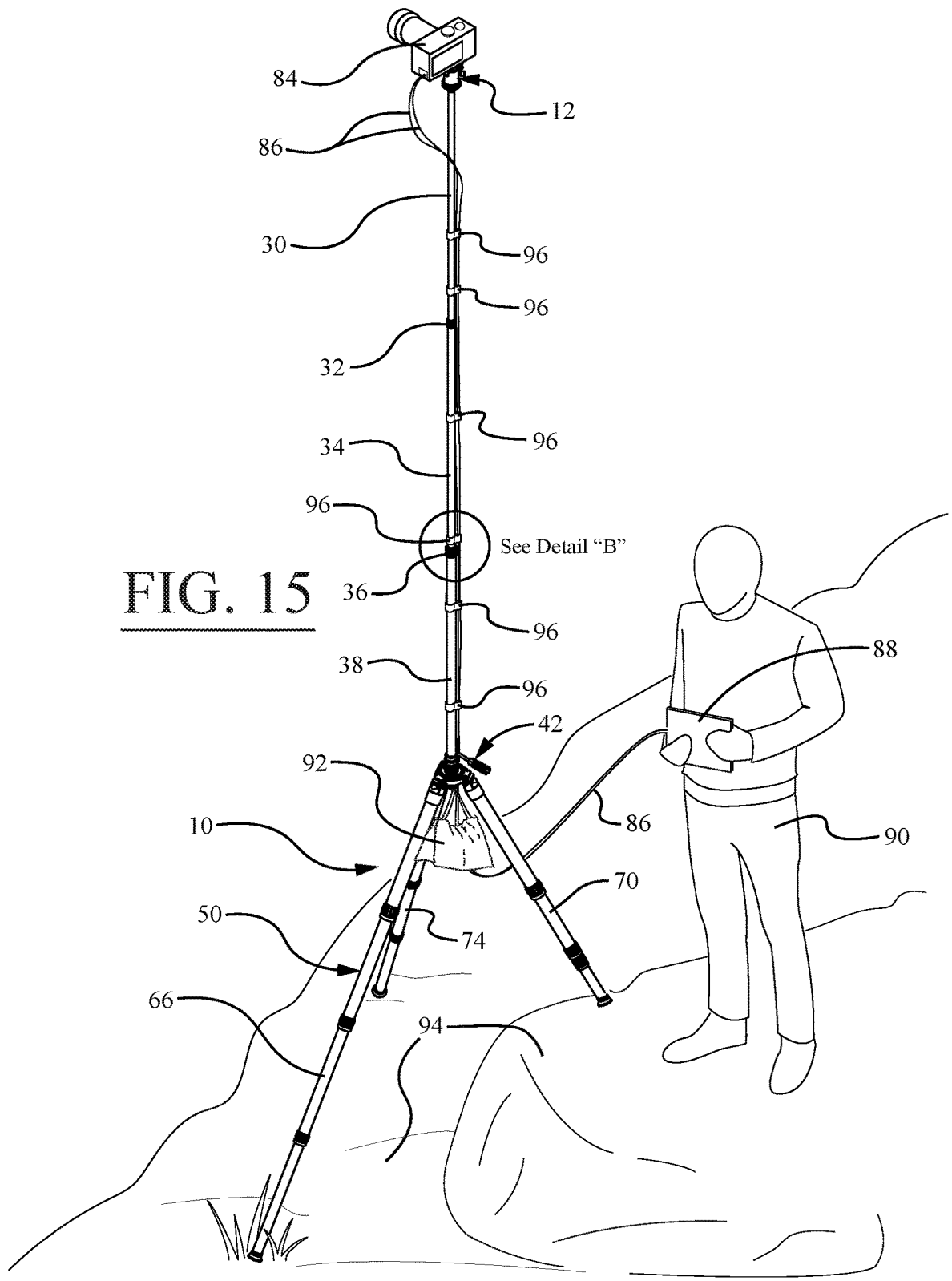
FIG. 15 is another perspective view of the portable camera support device of FIG. 1 in a fully deployed position, wherein the portable camera support device is shown supporting an elevated camera on uneven terrain.

Turning to the illustrative embodiment of FIG. 15, it can be seen that the portable camera support device 10 is able to readily accommodate uneven terrain 94. More specifically, as shown in FIG. 15, the telescopic adjustability of the base legs 66, 70, 74 allows the legs 66, 70, 74 to be adjusted to different lengths to accommodate underlying terrain of different heights. As shown in FIG. 15, the base leg 70 has a much shorter extending length as compared to the base legs 66, 74 so as to accommodate the higher portion of the terrain 94. In FIG. 15, a counterweight in the form of a sandbag 92 is shown hanging from the counterweight hook 62 of the lower cap member 60 so as to further stabilize the portable camera support device 10. The combination of the adjustable tripod base assembly 50 with the telescoping mast assembly 23 allows the user to capture an elevated shot regardless of ground condition, level, etc. That is, the user has the ability to capture an elevated camera angle regardless of the surface configuration (i.e., on a flat surface, in stands, on uneven ground, etc.).

In FIG. 15, a tablet computing device 88 (e.g., an iPAD® or Android™ device) is operatively coupled to the camera 84 (e.g., a Sony 4K® camera or other similar camera) by means of camera wire bundle 86 (e.g., including an HDMI cable coupling the tablet computing device 88 to the camera 84). In the illustrative embodiment of FIG. 15, the user 90 is shown holding the tablet computing device 88 in his hands. Although, in other embodiments, the portable camera support device 10 may comprise a mounting bracket configured to support the tablet computing device 88 or a visual display device that is operatively coupled to the camera 84. In these other embodiments, the mounting bracket for supporting the tablet computing device 88 may be disposed proximate to the central hub 56 of the portable camera support device 10 at a convenient mounting height for the user 90.

Figure 16:
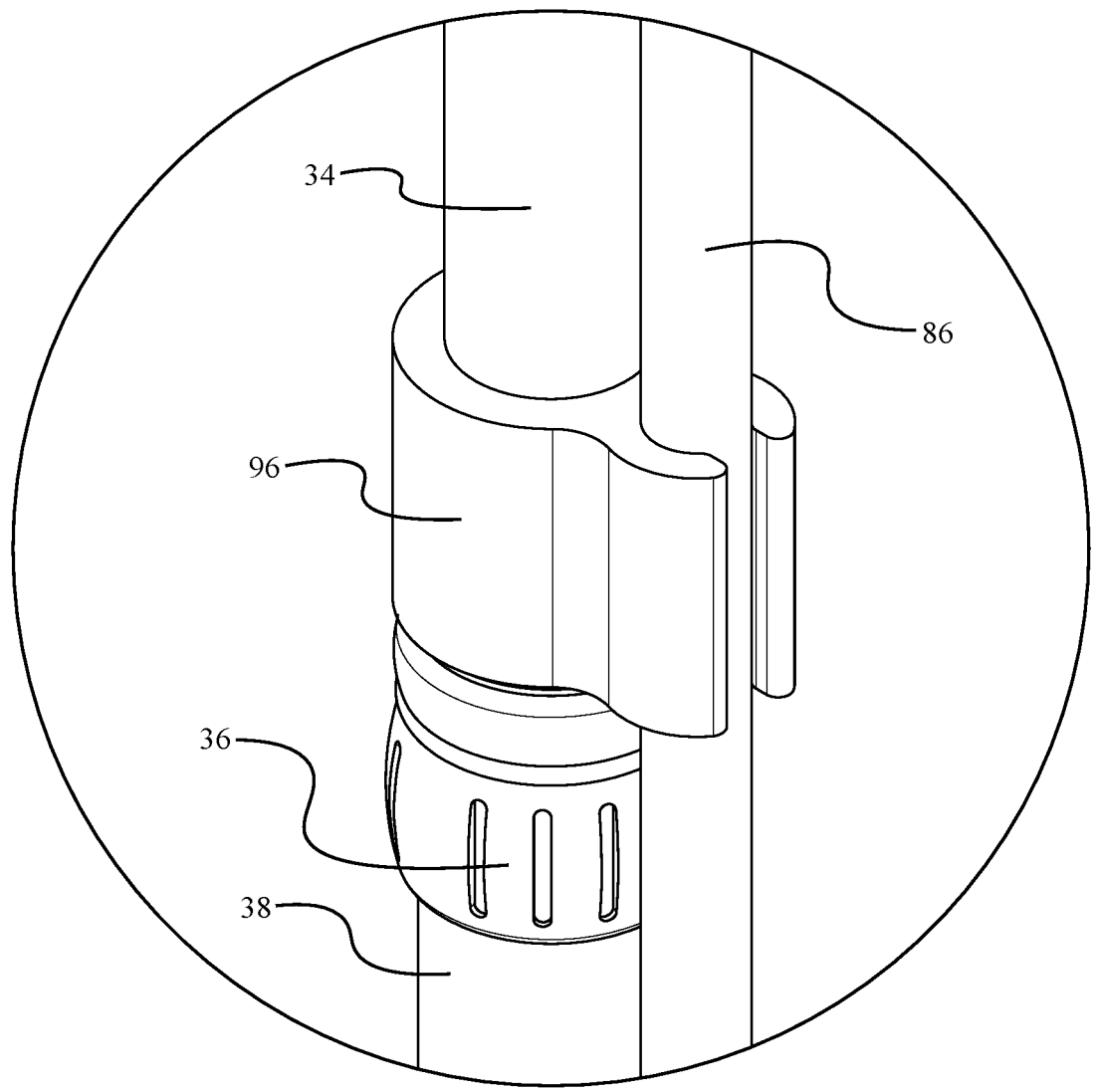
FIG. 16 is an enlarged perspective view of one of the mast wire hooks of the portable camera support device depicted in FIG. 15 (Detail "B")

Also, as shown in the perspective view of FIG. 15, a plurality of wire clamps 96 may be provided along the length of the telescoping mast assembly 23 in order to securely attach the camera wire bundle 86 to the central mast. For example, as shown in the detailed view of FIG. 16, each wire clamp 96 may have a pair of resilient prongs for coupling the camera wire bundle 86 to the central mast. Rather than wire clamps 96, wire hooks or other suitable fastening devices could be used to attach the camera wire bundle 86 to the central mast.

In another embodiment, the telescoping mast assembly 23 may be provided with handles for centering the mast. Also, in another embodiment, the camera mount 12 may be in the form of an electronic gimbal control where the orientation of the camera 84 relative to the telescoping mast assembly 23 could be adjusted remotely by a user on the ground. In yet another embodiment, the portable camera support device 10 may be used with a wireless camera, rather than the illustrative wired camera. In still another embodiment, an additional handle with manual camera zoom controls may be provided on the telescoping mast assembly 23 as an accessory.

Advantageously, the aforedescribed portable camera support device 10 is specifically designed to be used in conjunction with the latest camera technology, such as pan-tilt-zoom (PTZ) camera technology that is capable of remote directional and zoom control of the camera. In FIG. 15, the tablet computing device 88 is used by the user 90 to remotely control the operation of the camera 84 from the ground (e.g., by using an application loaded on the tablet computing device 88 to control the starting and stopping of the video recording and the zooming features of the camera 84). Also, as described above, another design feature of the illustrative device 10 is portability. The device 10 is designed to collapse to less than 48 inches for easy transportation on a commercial aircraft, while also achieving a fully extended height of 15 feet or more.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A portable camera support device for elevated photography and videography, the portable camera support device comprising:
   a base assembly, the base assembly including a plurality of collapsible legs extending downwardly from a central hub, at least one of the plurality of collapsible legs of the base assembly comprising a plurality of telescoping leg sections such that a length of the collapsible leg is adjustable anywhere between a collapsed position and an extended position;
   a telescoping mast assembly adjustably coupled to the central hub of the base assembly, the telescoping mast assembly including a plurality of telescoping pole members;
   a handle coupled to the telescoping mast assembly, the handle being disposed proximate to the central hub, the handle having a central rotational axis extending vertically along a length of the telescoping mast assembly, the handle being coupled to the telescoping mast assembly by means of a handle collar, the handle configured to allow a user to rotate a camera at an uppermost end of the telescoping mast assembly about the central rotational axis when the portable camera support device is in a deployed position, and the handle configured to rotate with the telescoping mast assembly about the central rotational axis;

a clamp collar, the clamp collar configured to fix a rotational position of the telescoping mast assembly relative to the base assembly, the clamp collar being separate from the handle;

a ring member coupled to the telescoping mast assembly, the ring member disposed between the clamp collar and the handle collar, the ring member disposed on a top of the clamp collar, and the ring member configured to prevent the telescoping mast assembly from sliding downward so that a rotational position of the telescoping mast assembly about the central rotational axis is able to be adjusted without an undesirable downward sliding of the plurality of telescoping pole members of the telescoping mast assembly; and a camera mount connected to, and supported by the uppermost end of the telescoping mast assembly, the camera mount being disposed above the uppermost end of the telescoping mast assembly, and the camera mount configured to attach the camera to the uppermost end of the telescoping mast assembly;

wherein the portable camera support device is configured to provide an elevated vantage point for the camera from which to photograph and/or record a desired area.

2. The portable camera support device according to claim 1, wherein, when the portable camera support device is in a deployed position, the base assembly has a base height measured from the ground to the central hub, and the telescoping mast assembly has a mast height measured from the central hub to a top surface of the camera mount; and wherein, in the deployed position, the mast height of the telescoping mast assembly is more than two times greater than the base height of the base assembly.

3. The portable camera support device according to claim 1, wherein the plurality of collapsible legs of the base assembly are pivotably coupled to the central hub such that each of the plurality of collapsible legs is movable from a deployed position to a collapsed position for compact transportation and storage of the portable camera support device.

4. The portable camera support device according to claim 1, wherein the plurality of collapsible legs of the base assembly comprises a first leg member, a second leg member, and a third leg member arranged in a tripod arrangement.

5. The portable camera support device according to claim 1, wherein the plurality of telescoping pole members of the telescoping mast assembly comprise a first telescoping pole member, a second telescoping pole member, and a third base pole member, the first telescoping pole member being slidingly received in the second telescoping pole member, and the second telescoping pole member being slidingly received in the third base pole member.

6. The portable camera support device according to claim 5, wherein the third base pole member is slidingly coupled to the central hub of the base assembly.

7. The portable camera support device according to claim 1, wherein the plurality of telescoping pole members of the telescoping mast assembly comprise a first telescoping pole member, a second telescoping pole member, a third telescoping pole member, and a fourth base pole member, the first telescoping pole member being slidingly received in the second telescoping pole member, the second telescoping pole member being slidingly received in the third telescoping pole member, and the third telescoping pole member being slidingly received in the fourth base pole member.

8. The portable camera support device according to claim 1, further comprising a cap member threadingly connected to a lower end of the telescoping mast assembly, the cap member including a counterweight hook for supporting a hanging counterweight so as to stabilize the telescoping mast assembly by preventing lateral movement of the portable camera support device.

9. The portable camera support device according to claim 1, wherein the central hub of the base assembly is configured to accommodate interchangeable telescoping mast assemblies so that the portable camera support device is adaptable for different needs of the user.

10. A portable camera support device for elevated photography and videography, the portable camera support device comprising:

a base assembly, the base assembly including a plurality of collapsible legs extending downwardly from a central hub;

a telescoping mast assembly adjustably coupled to the central hub of the base assembly, the telescoping mast assembly including a plurality of telescoping pole members;

a clamp collar, the clamp collar configured to fix a rotational position of the telescoping mast assembly relative to the base assembly;

a handle coupled to the telescoping mast assembly by means of a handle collar, the handle being separate from the clamp collar, and the handle configured to allow a user to rotate a camera at an uppermost end of the telescoping mast assembly when the portable camera support device is in a deployed position;

a ring member coupled to the telescoping mast assembly, the ring member disposed between the clamp collar and the handle collar, the ring member disposed on a top of the clamp collar, and the ring member configured to prevent the telescoping mast assembly from sliding downward so that a rotational position of the telescoping mast assembly about a vertical axis is able to be adjusted without an undesirable downward sliding of the plurality of telescoping pole members of the telescoping mast assembly; and a camera mount connected to, and supported by the uppermost end of the telescoping mast assembly, the camera mount being disposed above the uppermost end of the telescoping mast assembly, and the camera mount configured to attach the camera to the uppermost end of the telescoping mast assembly;

wherein the portable camera support device is configured to provide an elevated vantage point for the camera from which to photograph and/or record a desired area.

11. The portable camera support device according to claim 10, wherein the camera mount is configured to provide full angular adjustment of the camera attached to the camera mount.

12. The portable camera support device according to claim 11, wherein the camera mount comprises a rotatable ball head in order to provide the full angular adjustment of the camera attached to the camera mount.

13. The portable camera support device according to claim 10, wherein the handle is disposed above the clamp collar, and the handle is vertically spaced apart from the central hub by the clamp collar.

14. The portable camera support device according to claim 10, wherein the portable camera support device does not contain any pulleys for adjusting the camera.

15. The portable camera support device according to claim 10, further comprising a cap member threadingly connected to a lower end of the telescoping mast assembly, the cap member including a counterweight hook for supporting a hanging counterweight so as to stabilize the telescoping mast assembly by preventing lateral movement of the portable camera support device.

* * * * *